United States Patent Office
3,366,639
Patented Jan. 30, 1968

3,366,639
SYNTHESIS OF AMIDES FROM NITRILES
Louis R. Haefele, Winston-Salem, N.C., assignor to R. J. Reynolds Tobacco Company, Winston-Salem, N.C., a corporation of New Jersey
No Drawing. Filed Nov. 29, 1965, Ser. No. 510,384
9 Claims. (Cl. 260—295)

ABSTRACT OF THE DISCLOSURE

Conversion of nitriles to amides by means of manganese dioxide.

---

This invention relates to a method for preparing amides.

At the present time several methods are known to the art for converting nitriles (organic cyanides) to amides. Generally these prior art methods involve an acid or alkali catalyzed hydrolysis under carefully controlled conditions so as to minimize formation of acid. The majority of these prior art methods are not applicable to the conversion of nitriles in general and are not entirely satisfactory since the yields of the desired amides are frequently very low. One method which is widely used is the method of Radzisewski, Ber. 17, 1289–90 (1884) in which hydrogeen peroxide is employed as a reactant using an alkali catalyst. While this synthesis is relatively effective, it is hazardous and therefore not completely satisfactory.

It is a principal object of the present invention to provide a new method for converting nitriles to amides, which method has wide applicability, is not hazardous and is convenient to carry out.

In accordance with the present invention, it has now been discovered that nitriles (organic cyanides) can be readily converted to amides by the use as a catalyst of manganese dioxide. More particularly, the present invention involves a process for converting nitriles to amides wherein a nitrile, preferably dissolved in a solvent, is heated in the presence of water and manganese dioxide.

In a preferred embodiment of the invention, a nitrile, dissolved in a suitable solvent, is heated with a sufficient quantity of hydrated manganese dioxide containing a molar equivalent of water for a suitable period to effect the conversion of the nitrile to the amide. The minimum temperature to which the reaction mixture is heated is not particularly critical so long as temperatures substantially above ambient are employed. To achieve practical rates of reaction temperatures above about 50° C. are employed. Very high temperatures, such as 400° C., are to be avoided to avoid the possibility of reverse reactions occurring. Also, the time required for the reaction varies widely, depending upon the ease with which the nitrile undergoes conversion to the amide. Generally, the time of the reaction will be several hours or more.

The amide synthesis method of this invention has wide applicability and is applicable to the production of amides from nitriles in general. Thus, the nitrile can be represented by the general formula R—C≡N wherein R is a hydrocarbyl radical, that is, one composed principally of hydrogen and carbon atoms. For example, the R can be alkyl, cycloalkyl, alkenyl, cycloalkenyl, aryl, alkaryl, aralkyl or heterocyclic, each with or without additional substituents such as halogen, alkoxy, nitro, ester, ketone and acid functions and the like. Polynitriles can also be converted by the synthesis of the invention.

It will be appreciated by chemists that certain nitriles are converted to the amide more readily than others due to factors such as steric hindrance, the substituents on the nitrile and so forth. As a general rule, aryl and heterocyclic nitriles are converted to the amide more readily than are alkyl nitriles or vinyl nitriles. When dealing with nitriles less susceptible to conversion, those skilled in the art can be expected to employ conventional chemical expedients and vary the reaction conditions so as to optimize the synthesis. Such variations may include, for example, the use of higher temperatures, longer reaction periods, different solvents, greater amounts of manganese dioxide and so forth. Bearing this in mind, the reaction conditions set forth herein are merely illustrative and it is to be understood that reaction conditions other than as specified can be employed within the purview of the invention.

A variety of solvents can be employed in accordance with a preferred embodiment of the invention, the major criteria being that the material employed is a solvent for the nitrile which is to be converted and also that the solvent have a boiling point permitting the use of elevated temperatures as indicated previously. Representative solvents include dioxane, chloroform, benzene, toluene, pyridine, β-picoline, tert-amyl alcohol and the like. It is not necessary to employ a solvent in carrying out the synthesis of the invention but it is preferable to do so. Solvents facilitate carrying out the reaction such as by serving as a means of temperature control and as a diluent to aid filtration.

Anhydrous manganese dioxide can be employed as a catalyst, in which case it is necessary that water be present in the reaction mixture from one source or another. Molar equivalents of water are required for the reaction. Preferably for convenience hydrated or activated manganese dioxide is employed to supply the water. The amount of the catalyst to employ depends on various factors such as the reaction temperature, the desired conversion rate, etc. In general, from about 0.1 to about 5 molar equivalents (based on nitrile) of catalyst is employed.

The following specific examples illustrate in detail the synthesis of the present invention. In these specific examples activated manganese dioxide was prepared from the reaction of equivalent amounts of manganese sulfate and potassium permanganate in the presence of a small excess of sodium hydroxide, the temperature being maintained at 80°. The manganese dioxide was collected by filtration and washed with distilled water until the washings were neutral. Preferably, the manganese dioxide catalyst is substantially neutral and thus, if necessary, the catalyst can be washed with acid to neutralize it. By a "substantially neutral" manganese dioxide catalyst is meant one exhibiting a pH of from about 6.0 to 8.0 when 1.0 gram is added to 10 grams of water. The product was dried in an oven at 100–110° to constant weight and then allowed to equilibrate with the atmospheric moisture until there was no more gain in weight. The manganese dioxide thus prepared contained about 13.5 percent moisture, corresponding to an approximate molecular formula of $MnO_2 \cdot \tfrac{1}{2} H_2O$. All temperatures are in degrees centigrade.

*Example 1.—Acetonitrile in dioxane solution*

A solution of 1.56 grams of acetonitrile in 100 milliliters of dioxane was refluxed with stirring with 10.0 grams of manganese dioxide for five hours. After filtration and evaporation of the solvent, 1.90 grams (84 percent) of acetamide was obtained, melting point 68–72°.

*Example 2.—Benzonitrile in benzene solution*

A mixture of 4.125 grams of benzonitrile and 5.0 grams of manganese dioxide in 100 milliliters of benzene was stirred at reflux for five hours. After filtration and removal of the solvent, 2.522 grams of wet, yellowish crystals were isolated. The infrared spectrum indicated the product to be benzamide containing some unreacted benzonitrile.

The reaction was repeated using 4.96 grams of benzonitrile, 10.0 grams of manganese dioxide and 100 milliliters of benzene for five hours. The yield of benzamide, containing only a trace of nitrile, was 3.74 grams (65 percent).

*Example 3.—Benzonitrile in dioxane solution*

A solution of 4.96 grams of benzonitrile in 100 milliliters of dioxane was stirred at reflux with 10.0 grams of manganese dioxide for five hours. Filtration and evaporation afforded 5.35 grams (92 percent) of crystals of benzamide, melting point 125–128°. The infrared spectrum showed little or no unreacted benzonitrile.

*Example 4.—Acrylonitrile using a five-hour reaction time*

A suspension of 10 grams of manganese dioxide in 100 milliliters of dioxane containing 1.59 grams of acrylonitrile was refluxed with stirring for five hours. Filtration and evaporation of the solvent gave 0.777 gram (37 percent) of white crystals of acrylamide, melting point 54–56°.

*Example 5.—Acrylonitrile using a sixteen-hour reaction time*

A similar reaction, using 1.59 grams of acrylonitrile, 10.0 grams of manganese dioxide and 100 milliliters of dioxane for sixteen hours gave 1.282 grams (60 percent) of acrylamide, melting point 43–66°. Recrystallization from benzene-hexane raised the melting point to 72–73°.

*Examples 6–51*

In the following examples a solution of a convenient amount (usually 0.03 to 0.07 mole) of a nitrile dissolved in 100 milliliters of dioxane was stirred at reflux with a slight excess (10 to 20 grams) of hydrated manganese dioxide ($MnO_2 \cdot \frac{1}{2} H_2O$) for six (6) hours. Unless otherwise indicated, the solid was removed by filtration and the crude product isolated by evaporation of the solvent under reduced pressure. In all cases the identity of the amide and the presence of any unreacted nitrile were determined by means of the infrared spectrum of the crude product. The amide was recrystallized with an appropriate solvent and its melting point determined. In some instances departures from the above procedure were made such as in the use of anhydrous manganese dioxide or in the method of working up the product. These departures are indicated in the following table which summarizes the results.

TABLE I.—THE HYDRATION OF NITRILES TO AMIDES USING MANGANESE DIOXIDE

| Ex. | Nitrile | Amt. of Nitrile | | Amt. of $MnO_2$[1] | | Yield of Amide | | Melting Point | |
|---|---|---|---|---|---|---|---|---|---|
| | | G. | Moles | G. | Moles | G. | Percent | Obs., deg. | Lit., deg. |
| 6 | Propionitrile | 3.915 | 0.071 | 20 | 0.208 | 3.182 | 61 | 73–74 | 79 |
| 7 | n-Butyronitrile | 5.000 | 0.072 | 20 | 0.208 | 3.754 | 60 | 115–117 | 115 |
| 8 | Isobutyronitrile | 5.000 | 0.072 | 20 | 0.208 | 3.531 | 56 | 127–129 | 128 |
| 9 | n-Valeronitrile | 5.000 | 0.060 | 20 | 0.208 | 3.483 | 57 | 105–107 | 114–116 |
| 10 | n-Capronitrile | 5.000 | 0.052 | 10 | 0.104 | 2.379 | 40 | 100–101 | 101 |
| 11 | n-Tridecanonitrile | 0.966 | 0.005 | 10 | 0.104 | 0.847 | 80 | 98–99 | 98.5 |
| 12 | o-Tolunitrile | 5.000 | 0.043 | 10 | 0.104 | 0.310 | 5 | 143 | 140 |
| 13 | m-Tolunitrile | 5.000 | 0.043 | 10 | 0.104 | 5.296 | 91 | 91–92 | 97 |
| 14 | p-Tolunitrile | 5.000 | 0.043 | 10 | 0.104 | 5.718 | 99 | 160–161 | 160 |
| 15 | 3,4-dimethylbenzonitrile | 5.450 | 0.042 | 10 | 0.104 | 5.603 | 90 | 109–111 | 112 |
| 16 | α-Napthonitrile | 3.858 | 0.025 | 10 | 0.104 | 0.432 | 10 | 207–208 | 205 |
| 17 | Nicotinonitrile | 5.000 | 0.048 | 10 | 0.104 | 5.440 | 93 | 127–131 | 129–131 |
| 18 | Isonicotinonitrile | 5.000 | 0.048 | 10 | 0.104 | 5.247 | 90 | 157–158 | 155 |
| 19 | Methacrylonitrile | 5.000 | 0.075 | 20 | 0.208 | 2.154 | 34 | 109 | 102–106 |
| 20 | Cyclopropane carbonitrile | 5.000 | 0.075 | 20 | 0.208 | 5.437 | 85 | 128–129 | 125–126 |
| 21 | Malononitrile[2] | 5.200 | 0.079 | 20 | 0.208 | 6.993 | 87 | 168–171 | 170 |
| 22 | Succinonitrile[2] | 5.000 | 0.063 | 20 | 0.208 | 2.280 | 47 | 236–240 | 250 |
| 23 | Glutaronitrile[2] | 5.000 | 0.053 | 20 | 0.208 | 5.668 | 82 | 181–184 | 174 |
| 24 | Adiponitrile[2] | 5.000 | 0.046 | 20 | 0.208 | 2.379 | 36 | 229–233 | 220 |
| 25 | Pimelonitrile[2] | 5.000 | 0.041 | 20 | 0.208 | 5.147 | 68 | 172–174 | 174 |
| 26 | 1,4-cyclohexanedicarbonitrile[2] | 5.400 | 0.040 | 20 | 0.208 | 6.413 | 94 | >300 | |
| 27 | Phthalonitrile[2][4] | 5.000 | 0.039 | 20 | 0.208 | 4.139 | 63 | 233–235 | 233 |
| 28 | Ethyl Cyanoacetate | 5.315 | 0.047 | 10 | 0.104 | 3.344 | 54 | | |
| 29 | Cyanoacetamide[2] | 5.000 | 0.060 | 20 | 0.208 | 3.739 | 64 | 158–168 | 170 |
| 30 | Cyanoacetanilide[2] | 6.400 | 0.040 | 10 | 0.104 | 5.944 | 83 | 154–158 | 158 |
| 31 | α-Chloroacetonitrile | 3.150 | 0.042 | 10 | 0.104 | 2.852 | 73 | 118–120 | 119 |
| 32 | β-Chloropropionitrile | 2.276 | 0.025 | 10 | 0.104 | 0.796 | 29 | 71–77 | 102 |
| 33 | β-Bromopropionitrile | 3.271 | 0.024 | 10 | 0.104 | 0.503 | 14 | 76–80 | 110–111 |
| 34 | γ-Bromobutyronitrile[3] | 6.200 | 0.042 | 10 | 0.104 | 4.257 | 61 | | 25 |
| 35 | β-Methoxypropionitrile | 3.500 | 0.041 | 10 | 0.104 | 3.435 | 81 | 39–43 | 50 |
| 36 | β-Isopropoxypropionitrile | 4.700 | 0.042 | 10 | 0.104 | 4.497 | 82 | 52–55 | |
| 37 | β-Dimethylaminopropionitrile | 5.000 | 0.051 | 20 | 0.208 | 3.903 | 66 | | 40 |
| 38 | β-Isopropylaminopropionitrile | 4.700 | 0.040 | 10 | 0.104 | 3.603 | 69 | | |
| 39 | Dimethylcyanamide[2] | 5.000 | 0.071 | 20 | 0.208 | 1.978 | 32 | 163–173 | 182–184 |
| 40 | Cyanoethylglycerine[5] | 5.000 | 0.020 | 20 | 0.208 | 5.892 | 97 | | |
| 41 | Cyanoethylsucrose[5] | 4.978 | 0.0065 | 20 | 0.208 | 5.797 | 98 | | |
| 42 | Thiodipropionitrile | 6.200 | 0.044 | 20 | 0.208 | 0.612 | 8 | 178–182 | 182 |
| 43 | Iminodipropionitrile[2] | 5.200 | 0.042 | 20 | 0.208 | 2.411 | 37 | 140–144 | 145 |
| 44 | Iminodiacetonitrile | 3.800 | 0.040 | 20 | 0.208 | 4.794 | 91 | 154d | 143 |
| 45 | Nitrilotriacetonitrile[2] | 3.600 | 0.027 | 20 | 0.208 | 4.740 | 93 | 201d | 205d |
| 46 | Ethylenediaminetetracetonitrile[2] | 4.400 | 0.020 | 20 | 0.208 | 6.419 | 100+ | 120–132 | |
| 47 | Phenylacetonitrile[6] | 5.075 | 0.043 | 10 | 0.104 | 4.306 | (85) | | |
| 48 | Diphenylacetonitrile[6] | 10.000 | 0.052 | 20a | 0.230 | 12.440 | (124) | 203–209 | |
| 49 | p-Chlorophenylacetonitrile[6] | 5.245 | 0.035 | 10 | 0.104 | 4.393 | (84) | 190–191 | |
| 50 | p-Methoxyphenylacetonitrile[6] | 5.800 | 0.039 | 10a | 0.115 | 4.314 | (74) | | |
| 51 | p-Nitrophenylacetonitrile[6] | 6.500 | 0.040 | 10a | 0.115 | 4.717 | (73) | 228d | |

[1] Calculated as $MnO_2 \cdot 1/2 H_2O$ except in those cases marked "a" where anhydrous material was used.

[2] The insolubility of diamides in dioxane necessitated a modification of the general procedure for working up the products from the hydration of dinitriles. After filtration of the reaction mixture, the manganese dioxide was resuspended in warm water, filtered again, and the filtrates were evaporated to dryness. The combined weights of the two fractions (dioxane-soluble and water-soluble) were taken as the crude yield. This procedure was used for working up the products from all of the dinitriles, from cyanoacetamide, cyanoacetanilide and from several other polyfunctional compounds where the products were insoluble in dioxane. Further modification of the above procedure was necessary in the case of 1,4-cyclohexanedicarbonitrile, where the amide is insoluble in water as well as in dioxane. The manganese dioxide was washed with dimethylformamide in a manner similar to that described above for the water washing. However, the combined weight of all three fractions was only 712 mg. Therefore, the manganese dioxide was dissolved by suspending it in 500 milliliters of 10 percent sulfuric acid and slowly adding a solution of 50 grams of sodium metabisulfite in 200 milliliters of water. The white solid was collected by filtration, washed thoroughly with water, and air dried to give 5.701 grams of the diamide product.

[3] The infrared spectrum indicated that the principal product obtained from 4-bromobutyronitrile was pyrrolidone (α-butyrolactam).

[4] The product was phthalimide.

[5] The reactions were run for 24 hours and were worked up according to the procedure of ([2]).

[6] Phenylacetonitrile and its derivatives did not readily undergo hydration to the amide and a complex mixture (including the amide) of products was obtained. While not meaning to be bound by theoretical discussion, these results may be explained on the basis of a side reaction taking place involving coupling between sensitive active methylene groups. Possibly competition exists between the "main" (hydration) reaction and the "side" (coupling) reaction.

As can be seen from the above examples, the conversion of nitriles to amides is generally straightforward with the production of good yields of desired amides. However, the examples further illustrate that in certain instances, depending upon the particular nitrile starting material or the solvent involved, the yield of amide was lower than desired or special procedures were called for to recover the product. It is to be understood, however, that these examples are merely illustrative of applicant's basic invention, namely the conversion of nitriles to amides by the use of water and manganese dioxide as a catalyst. In particular cases it is expected that those skilled in the art, once apprised of the basic invention, can readily employ various expedients to increase the yield of amide and/or to reduce production of by-products.

One convenient preparative method for the conversion of certain nitriles to amides utilizes an azeotrope of the nitrile with water. For example, acetonitrile and water form a constant boiling mixture containing 83.7% nitrile and having a boiling point of 76.5°. A mixture of equimolar quantities of acetonitrile and water is heated at reflux in an apparatus designed such that the vapors (of the azeotrope) envelop a porous container in which a quantity of manganese dioxide catalyst has been placed, and situated such that the condensate of the azeotrope will pass through the bed of catalyst. Part of the nitrile and water combine under the influence of the catalyst to form the amide (e.g., acetamide). The unreacted nitrile and water containing the amide then pass through the container and are returned to the pot. The amide is essentially non-volatile under these conditions and concentrates in the pot. Continuous cycling makes this an efficient process for preparative runs. Experiments show that the catalyst does not lose appreciable activity with repeated use.

Those modifications and equivalents which fall within the spirit of the invention and the scope of the appended claims are to be considered part of the invention.

I claim:
1. A process which comprises heating a nitrile compound to a temperature above ambient in the presence of water and manganese dioxide for a period sufficient to convert the nitrile to the corresponding amide and recovering the amide so produced.
2. A process according to claim 1 wherein temperatures above about 50° C. are employed.
3. A process according to claim 1 wherein the manganese dioxide is of substantially neutral character.
4. A process according to claim 1 wherein the nitrile compound is dissolved in a liquid solvent, selected from the group consisting of water, dioxane, chloroform, benzene, toluene, pyridine, beta-picoline and tertiary-amyl alcohol.
5. A process according to claim 4 wherein temperatures above about 50° C. are employed.
6. A process according to claim 4 wherein the manganese dioxide is of substantially neutral character.
7. A process according to claim 4 wherein heating is carried out at the reflux temperature of the solution.
8. A process which comprises heating a nitrile compound in the presence of hydrated manganese dioxide to a temperature above ambient for a period sufficient to convert the nitrile to the corresponding amide and recovering the amide so produced.
9. A process according to claim 8 wherein the nitrile compound is dissolved in a liquid solvent, selected from the group consisting of water, dioxane, chloroform, benzene, toluene, pyridine, beta-picoline and tertiary-amyl alcohol.

References Cited

FOREIGN PATENTS 551,869 6/1932 Germany.

WALTER A. MODANCE, *Primary Examiner.*

A. L. ROTMAN, *Assistant Examiner.*